United States Patent

[11] 3,583,824

| [72] | Inventors | Robert J. Smuland<br>Cincinnati;<br>Ned A. Hope, Loveland; David M. Kercher,<br>Cincinnati, all of, Ohio |
|---|---|---|
| [21] | Appl. No. | 863,140 |
| [22] | Filed | Oct. 2, 1969 |
| [45] | Patented | June 8, 1971 |
| [73] | Assignee | General Electric Company |

[54] TEMPERATURE CONTROLLED SHROUD AND SHROUD SUPPORT
10 Claims, 2 Drawing Figs.

[52] U.S. Cl. .................................................. 415/117,
415/134, 415/174, 60/39.66
[51] Int. Cl. ....................................................... F01d 25/12,
F01d 1/00, F02c 7/12
[50] Field of Search ........................................... 416/95, 96,
97; 415/115, 116, 117, 134—139, 170—174;
60/39.66

[56] References Cited
UNITED STATES PATENTS

| 3,056,583 | 10/1962 | Varadi et al. ................. | 415/174 |
|---|---|---|---|
| 3,092,393 | 6/1963 | Morley et al. ................. | 415/174 |
| 3,142,155 | 7/1964 | Leuesque et al. ............. | 60/39.66 |
| 3,362,681 | 1/1968 | Smuland ........................ | 415/115 |
| 3,365,172 | 1/1968 | McDonough et al. ........ | 415/117 |
| 3,391,904 | 7/1968 | Albert et al. .................. | 415/170 |
| 3,425,665 | 2/1969 | Lingwood ...................... | 415/134 |
| 3,433,015 | 3/1969 | Sneeden ........................ | 415/115 |
| 3,443,791 | 5/1969 | Seuetz et al. .................. | 415/115 |

*Primary Examiner*—Henry F. Raduazo
*Attorneys*—Derek P. Lawrence, Erwin F. Berrier, Jr., Lee H. Sachs, Frank L. Neuhauser, Oscar B. Waddell and Joseph B. Forman ABSTRACT: A shroud for a turbine or the like having an inner surface for defining a flow passage and carrying a perforated baffle for impinging a pressurized fluid against the external surface of the shroud. The shroud is mounted by a support structure defining a chamber outwardly of the shroud which is compartmentalized by the baffle. Passageways are formed through the support structure to first direct the pressurized fluid into the outer compartment and toward a compartment wall defined by the support structure before transit through the impingement baffle so as to provide effective temperature control for the shroud and shroud support during transient and steady-state operation.

PATENTED JUN 8 1971　　　　　　　　　　　　　　　3,583,824
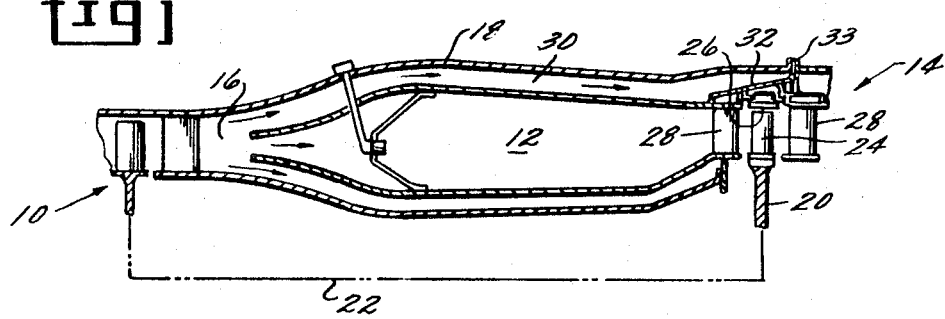
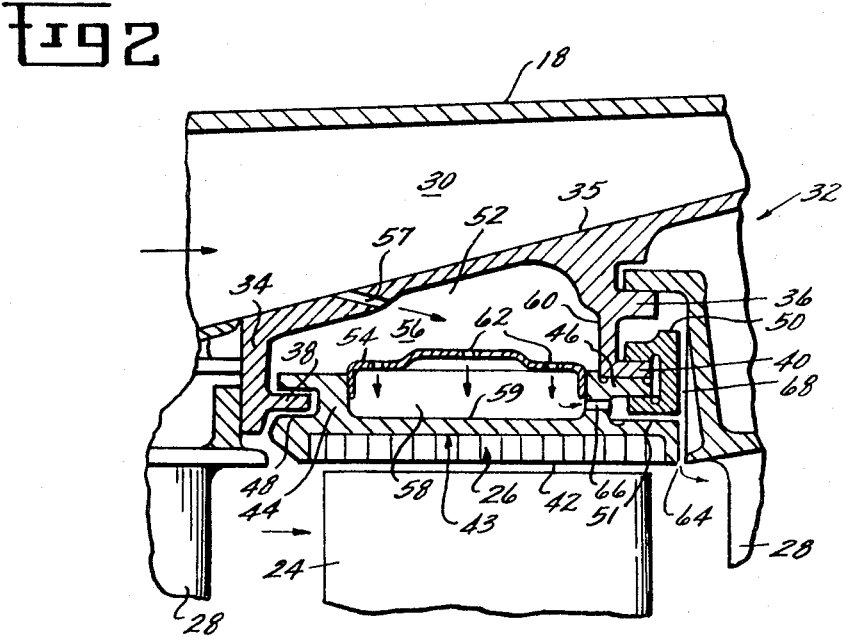
INVENTORS
ROBERT J. SMULAND
NED A. HOPE
DAVID M. KERCHER
BY
ATTORNEY

TEMPERATURE CONTROLLED SHROUD AND SHROUD SUPPORT

This invention relates to turbomachinery and, more particularly, to a shroud and associated supporting structure adapted to efficiently and effectively utilize pressurized fluid for temperature control purposes.

During startup or acceleration transients of a turbomachine or gas turbine engine, the turbine blade increases rapidly in temperature and size. On the other hand, the relatively massive structure for supporting the nonrotating elements of the turbine, such as the vanes and shrouds, does not respond as rapidly in terms of increased temperature and thermal growth due to its larger thermal inertia and remoteness to the hot gas stream. This difference in thermal growth within the support member, and to some degree the shroud, and between the support member and turbine blades may result in undesirable variations in the turbine blade tip-to-shroud clearance.

At the same time, during steady-state engine operation it is important that cooling be provided so as to prevent the shroud and shroud support materials from exceeding their upper operating temperature, as well as to prevent excessive thermal stressing and buckling.

The present invention, then, is concerned with means for efficiently and effectively utilizing air pressurized by a compressor or the like for selective heating and cooling of the turbine shroud and shroud supporting structure so as to control the blade tip-to-shroud clearance during engine operating transients and maintain the temperature of these elements sufficiently low to minimize thermal stressing and prevent distortion.

A primary object of this invention is to provide transient compatibility between growth of rotor and stator turbomachinery components.

Another object of this invention is to provide improved means for preventing undesirable variations in the turbine blade to turbine shroud clearance during transient operation of gas turbine engine using air pressurized by the compressor.

A further object of this invention is to provide means for controlling the temperature of a turbomachinery shroud and shroud support structure during transient and steady-state gas turbine operation.

Another object of this invention is to provide a turbine having an improved heating and cooling arrangement wherein pressurized fluid is first directed toward the shroud support structure and then, sequentially, impinged against the outer surface of the shroud.

Yet another object of this invention is to provide temperature control means for a gas turbine engine shroud and shroud support structure which require reduced amounts of compressor-pressurized air and, hence, provide increased engine efficiency.

A further object of this invention is to provide a shroud structure of simple and economical construction which includes highly efficient temperature control means formed integrally therewith.

These and other objects will become apparent upon reading the following description of the preferred embodiment.

Briefly stated, the present invention provides a turbine shroud element having means for impinging a pressurized fluid against the shroud in a manner generating high heat transfer rates. The shroud is preferably fabricated using a perforated thin wall insert or baffle secured to the main body member of the shroud so as to define a compartment of small radial height therebetween. The shroud construction of this invention is of particular advantage where the shroud supporting structure includes a flange of relatively high thermal inertia normally disposed at a remote location relative to the high temperature fluid flow of, for example, a gas turbine engine. In such an arrangement, means are provided to first direct the pressurized fluid toward the flange to heat the flange during engine startup and acceleration and cool the flange during steady-state operation. The fluid then passes through the baffle and is used for temperature control of the shroud. Stated another way, the present invention provides shroud means, shroud support means, including a flange disposed in a thermally remote location relative to the high temperature fluid flow in a gas turbine engine, and means for directing compressor-pressurized fluid toward the flange and then, sequentially, impinging the pressurized fluid against the shroud. In one form, the shroud support means extends across a passage in flow communication with a compressor and defines a chamber outwardly of the shroud means. Means are provided, preferably carried by the shroud means and comprising a thin insert or baffle, for dividing the chamber into inner and outer compartments together with means for directing compressor-pressurized fluid into the outer compartment for temperature control of the shroud support structure and then, sequentially, impinging such fluid against the shroud means. Means are also provided for effluxing the pressurized air from the inner chamber, preferably along the downstream edge of the shroud means, to the motive fluid.

While the specification concludes with claims particularly pointing out and distinctly claiming the subject matter of this invention, it is believed that the invention will be better understood from the following description of the preferred embodiment taken in connection with the accompanying drawings wherein:

FIG. 1 is a partial sectional view diagrammatically showing the compressor, combustor and turbine portions of a gas turbine engine employing the present invention; and FIG. 2 is an enlarged cross-sectional view of the turbine portion of the gas turbine engine of FIG. 1.

Like reference numerals will be used in referring to like parts throughout the following description of the preferred embodiment.

With reference to FIG 1, a portion of a gas turbine engine has been shown diagrammatically as comprising a compressor 10, a combustor 12 and a turbine 14 arranged in serial flow relationship along a passage 16 which is defined in part by suitable stationary casing structure 18. As will be understood, the compressor 10 is adapted to pressurize air for delivery to the combustor 12 wherein a motive fluid or hot gas stream is generated for driving the turbine 14.

The turbine 14 is generally comprised of a rotor 20, drivingly connected to the compressor 10 by a shaft 22, and at least one circumferential row of turbine blades 24 extending generally radially therefrom into close spaced relationship with suitable shroud means 26. The turbine 14 may also include one or more circumferential rows of stationary vanes 28 for directing the motive fluid to the blades 24.

The stationary casing structure 18 is generally annular and spaced radially outwardly of the combustor 12 so as to define an annular passage 30 therebetween which communicates with the compressor 10 for delivery of compressor-pressurized air to the combustor and vanes 28 for cooling purposes.

The stationary turbine elements, such as the vanes 28 and shroud means 26, are supported by means 32 suitably secured as at 33 to the casing structure 18. As will be understood, support means 32 may be formed as an integral cast unit or as a plurality of arcuate segments.

With reference now to FIG. 2, the shroud support means 32 has been shown as comprising a main body portion 35, extending across the passage 30, and axially spaced upstream and downstream hangers or flanges 34 and 36, respectively, formed with axially rearwardly projecting rails 38 and 40.

The shroud means 26 is formed with an inner surface 42 adapted to form the outer boundary of the motive fluid or hot gas flow across the turbine blades and preferably comprises a plurality of segments, each of which includes an arcuate main body portion 43 formed with upstream and downstream circumferential flanges 44 and 46, respectively projecting radially outwardly therefrom. The upstream end of the shroud means 26 may be conveniently secured to the support structure 32 by engagement of the projecting rail 38 with a groove 48 formed in the upstream shroud flange 44, while the downstream end may be secured to the hanger 36 using suitable clamp means, such as a C-shaped, arcuate bracket 50 adapted to engage an axial groove 51 formed in the downstream shroud flange 46 and overlap downstream rail 40. It will be understood, however, that other attachment means may be employed.

A chamber 52 is cooperatively formed, intermediate hangers or flanges 34 and 36, by the support means 32 and shroud means 26. Means, preferably comprising a thin-wall insert or baffle 54 suitably secured to the shroud means 26 as by welding or by brazing to the shroud flanges 44, 46, are provided for dividing the chamber 52 into an outer compartment 56 and an inner compartment 58 defined in part by the exterior surface 59 of shroud main body portion 43.

In order to provide controlled thermal growth of the outer boundary of the motive fluid flow passage 42 relative to the thermal growth of the turbine blades 24 so as to preclude undesirable interference between the blades and shroud, means comprising one or more passageways 57 are provided through the shroud support means 32 for directing compressor-pressurized air, at an elevated temperature, into the outer compartment 56 and toward downstream chamber wall 60 which is defined by the support flange or hanger 36. The chamber dividing means or baffle 54 is preferably formed with a plurality of perforations 62 which are sized to direct the air from the outer compartment 56 to the inner compartment 58 and against the exterior shroud surface 59 as a plurality of high velocity streams whereby the convective heat transfer coefficient and heat transfer rate between the fluid and the shroud means 26 is significantly increased. In order to provide a high fluid impingement velocity, the inner compartment is preferably of small radial height.

To provide a continuous flow of fluid from passage 30 into and through compartments 56, 58, means 64 are provided for effluxing the cooling fluid from compartment 58 to the motive fluid stream. Such means preferably comprise a plurality of axial passages 66 formed through the downstream shroud flange 46, which passages communicate with the downstream groove 51 so that efflux or discharge occurs through the annular space 68 between the shroud means 26 and its closely adjacent downstream turbine element, such as the vane 28. In this manner, an insulating blanket of relatively cook air is provided for clamp means 50 and adjacent turbine elements, and an influx of high temperature gases into the clearance space 68 is prevented.

The use, operation and function of this invention are as follows:

During startup and acceleration of a gas turbine engine, the temperature of the air discharged by the compressor 10 and the hot gas or motive fluid stream discharged by the combustor 12 increases rapidly. The turbine blades 24, due to their low thermal inertia and proximity to the hot gas stream, also increase rapidly in temperature with a resultant rapid thermal growth and increase in radial height.

While portions of the shroud means and shroud support means 32 are exposed to the increasing fluid temperature with the hot gas stream passage and passage 30, some portions are not. For example, it will be noted that the aft radial flange or hanger 36, which is usually formed of substantial mass so as to provide structural stiffness to the main body portion 35, is positioned remotely with respect to the elevated fluid temperatures of passage 30 and the hot gas stream. In order to heat such thermally remote portions of the shroud and shroud support structure during engine startup and acceleration so as to prevent undesirable temperature gradients, thermal stresses and distortion, means taking the form of passageways 57 are provided for directing the high temperature fluid of passage 30 toward the flange 36. After heating the flange 36, the fluid is impinged against the external surface 59 of the shroud means 26 as a plurality of relatively high velocity streams so as to effect high heat transfer rates therebetween and efficient temperature control for the shroud means, and exhausted through means 64 to the hot gas stream. By exhausting the gases through the clearance space 68 intermediate the shroud means and its adjacent downstream vane 28, influx of hot gases into this space is prevented. During steady-state engine operation, cooling is provided to the shroud and shroud support structure in the manner described above.

By using compressor-pressurized fluid to first heat or cool the shroud support means and then, sequentially, using that same fluid to heat or cool the shroud means, it has been found that less fluid is required to maintain satisfactory operating temperatures and temperature gradients in these elements. Since the use of compressor-pressurized fluid for temperature control purposes is in and of itself subtractive to engine efficiency, it will be recognized that by operating at reduced charge to the compressor, the present invention enhances engine efficiency.

From the foregoing, it will be appreciated that the temperature control means of the present invention enables efficient and effective utilization of compressor-pressurized fluid to reduce operating temperatures and temperature gradients within the shroud and shroud support means, and provides transient growth compatibility between the shroud and turbine blades so as to preclude undesirable interference therebetween.

While the present invention has been described in connection with and is particularly applicable to a turbine, it should be understood that the present invention may be effectively utilized in compressors or other apparatus wherein temperature control of a structural member and an adjacent element supported by the structural member is required.

Although the baffle or dividing means 54 is preferably formed of thin sheet material and is secured to the shroud, it will be understood that it may be formed or cast integrally with the shroud.

Accordingly, while a preferred embodiment has been depicted and described, it will be appreciated by those skilled in the art that many modifications and changes may be made thereto without departing from the fundamental theme of the invention.

What we claim is:

1. In a turbomachine of the type having a compressor, a combustor for generating a motive fluid stream and a turbine disposed in serial flow relationship; shroud means defining the outer boundary of motive fluid flow through at least a portion of said turbine; and means for supporting said shroud means including a portion in flow communication with fluid pressurized by said compressor and a flange of large thermal mass normally disposed in a thermally remote position relative to said motive fluid stream and said compressor-pressurized fluid, the improvement comprising:

means for directing compressor-pressurized fluid toward said flange and then, sequentially, impinging such fluid against said shroud means, whereby effective temperature control of said shroud and shroud support means is provided during transient and steady-state operation of said turbomachine.

2. The improved turbomachine of claim 1 wherein said shroud and shroud support means cooperatively define a chamber, with a first wall of said chamber defined by the portion of said support means in flow communication with said pressurized fluid and another chamber wall defined by said flange, with said directing and impinging means comprising a perforated baffle dividing said chamber into an inner compartment having a wall defined by said shroud means and passageways formed through said chamber first wall for communicating said outer compartment with said pressurized fluid.

3. The improved turbomachine of claim 2 wherein said perforated baffle is carried by said shroud means.

4. The improved turbomachine of claim 2 further characterized by and including means for discharging said pressurized fluid from said inner compartment to said motive fluid flow.

5. A turbine comprising a rotor, a plurality of blades carried by said rotor and extending generally radially therefrom, shroud means disposed radially outwardly of said blades and in close spaced relationship thereto for defining at least a portion of the outer boundary of motive fluid flow through said turbine, means to support said shroud means and define a chamber in cooperation therewith, means carried by said shroud means for dividing said chamber into inner and outer compartments, passage means formed through said support means for communicating said outer chamber with a source of pressurized fluid, said dividing means being perforated so as to communicate said inner and outer chambers and impinge said pressurized fluid against said shroud means whereby heating and cooling of said support means and said shroud means is achieved at reduced charge to said source of pressurized fluid.

6. The turbine of claim 5 further characterized in that said dividing means comprises a thin insert secured to said shroud means.

7. The turbine of claim 5 further characterized by and including a circumferential row of vanes carried by said support means downstream of and closely spaced to said shroud means, and means for discharging the pressurized fluid from said inner compartment to the flow of motive fluid intermediate said shroud means and said vanes.

8. In a turbomachinery shroud having an inner surface for defining a portion of an annular motive fluid passage across a bladed rotor and of the type adapted for attachment to shroud support means in flow communication with a source of pressurized fluid, the improvement comprising:

means carried by said shroud and forming a compartment outwardly of said inner shroud surface, a plurality of passageways for communicating said pressurized fluid with said compartment and adapted to impinge said fluid against said shroud as a plurality of high velocity jets for effective temperature control of said shroud, and passageways formed through said shroud for effluxing said pressurized fluid from said compartment to the motive fluid passage to establish a continuous flow of pressurized fluid through said compartment.

9. The improved turbomachinery shroud of claim 8 further characterized in that said shroud includes an arcuate main body portion defining said inner surface and axially spaced upstream and downstream radially outwardly projecting circumferential flanges, said compartment defined by a thin member extending between and secured to said flanges, said impingement passageways comprising perforations in said thin member.

10. The improved turbomachinery shroud of claim 8 further characterized in that said efflux passageways are formed through said downstream flange.